(12) United States Patent
Minear et al.

(10) Patent No.: US 9,989,634 B2
(45) Date of Patent: Jun. 5, 2018

(54) SYSTEM AND METHOD FOR DETECTION AND ORBIT DETERMINATION OF EARTH ORBITING OBJECTS

(71) Applicant: Specialized Arrays, Inc., Melbourne Beach, FL (US)

(72) Inventors: Kathleen Minear, Palm Bay, FL (US); G. Patrick Martin, Merritt Island, FL (US)

(73) Assignee: Specialized Arrays, Inc., Melbourne Beach, FL (US)

( * ) Notice: Subject to any disclaimer, the term of this patent is extended or adjusted under 35 U.S.C. 154(b) by 579 days.

(21) Appl. No.: 14/693,204

(22) Filed: Apr. 22, 2015

(65) Prior Publication Data

US 2015/0355324 A1     Dec. 10, 2015

Related U.S. Application Data

(60) Provisional application No. 61/982,479, filed on Apr. 22, 2014.

(51) Int. Cl.
| | |
|---|---|
| *G01S 19/00* | (2010.01) |
| *G01S 13/58* | (2006.01) |
| *G01S 7/41* | (2006.01) |
| *G01S 13/02* | (2006.01) |
| *G01S 13/95* | (2006.01) |

(52) U.S. Cl.
CPC ............... *G01S 13/58* (2013.01); *G01S 7/411* (2013.01); *G01S 13/0218* (2013.01); *G01S 13/951* (2013.01); *G01S 2013/0245* (2013.01)

(58) Field of Classification Search
CPC .................................. G01S 13/58; G01S 7/411
USPC .................................. 342/95, 357.2, 357.395
See application file for complete search history.

(56) References Cited

U.S. PATENT DOCUMENTS

| | | | | | |
|---|---|---|---|---|---|
| 6,049,305 | A | * | 4/2000 | Tassoudji | H01Q 1/362 342/357.76 |
| 6,133,997 | A | * | 10/2000 | Yamawaki | B64G 1/1021 250/203.3 |
| 6,175,340 | B1 | * | 1/2001 | Olds | H01Q 3/08 343/824 |
| 7,576,688 | B2 | * | 8/2009 | Lehtinen | G01S 13/56 342/107 |
| 9,189,451 | B1 | * | 11/2015 | Freedman | B64G 3/00 |
| 9,194,947 | B1 | * | 11/2015 | Mohamed | G01S 13/582 |

(Continued)

OTHER PUBLICATIONS

Mehrholz, D., et.al, "Detecting, Tracking and Imaging Space Debris", ESA Bulletin (ISSN 0376-4265), No. 109, p. 128-134 (2002).*

(Continued)

*Primary Examiner* — Marcus E Windrich
(74) *Attorney, Agent, or Firm* — Ward Law Office LLC; Jacob M. Ward (57) ABSTRACT

A system for detection and orbit determination of Earth orbiting objects includes a first plurality of sensors including at least one first antenna. The at least one first antenna is configured to point in a stare mode to broadcast a first detection signal at an angular region centered on an equatorial plane to maximize detection of orbiting objects regardless of altitude, grade, or inclination. The first antenna may be configured to stare at a low inclination angle, and may be configured to stare at one of due east and due west along the equator.

20 Claims, 7 Drawing Sheets

(56) References Cited

U.S. PATENT DOCUMENTS

| | | | | |
|---|---|---|---|---|
| 2008/0081556 A1* | 4/2008 | Robinson | ........... | H04B 7/18519 455/12.1 |
| 2012/0183035 A1* | 7/2012 | Vierinen | ............... | G01S 7/2926 375/227 |
| 2013/0278757 A1* | 10/2013 | Martin | ..................... | B64G 3/00 348/135 |
| 2013/0292517 A1* | 11/2013 | Briskman | ................. | B64G 1/24 244/158.8 |
| 2015/0325913 A1* | 11/2015 | Vagman | ............... | H01Q 3/2605 342/368 |

OTHER PUBLICATIONS

Kelso, T.S., "Space Surveillance", Satellite Times, Sep./Oct. 1997.*
Mehrholz, D., et.al, "Detecting, Tracking and Imaging Space Debris", ESA Bulletin (ISSN 0376-4265), No. 109, p. 128-134 (2002). (Year: 2002).*
Kelso, T.S., "Space Surveillance", Satellite Times, Sep./Oct. 1997. (Year: 1997).*
Wolfgang Riede, German Aerospace Center, Institute of Technical Physics, Optical reconnaissance (Space situational awareness), http://www.dlr.de/tp/en/desktopdefault.aspx/tabid-7107/11750_read-27635/, 3 pages.

* cited by examiner

SYSTEM AND METHOD FOR DETECTION AND ORBIT DETERMINATION OF EARTH ORBITING OBJECTS

CROSS-REFERENCE TO RELATED APPLICATION

This application claims the benefit of U.S. Provisional Patent Application No. 61/982,479, filed on Apr. 22, 2014. The entire disclosure of the above application is hereby incorporated herein by reference.

FIELD OF THE INVENTION

This disclosure relates to Space Situational Awareness (SSA). In particular, this disclosure relates to detection and orbit determination of Earth orbiting objects, monitoring of space junk which poses a threat to active satellites, avoidance of collisions of active satellites, and surveillance of assets.

BACKGROUND OF THE INVENTION

Debris orbiting around the earth increasingly is a concern to all space operations due to potential collisions with existing or new space vehicles. Low inclination, low orbiting objects (LILO) are of particular threat because current ground detection systems don't adequately address them, either due to the location of the ground detection system or due to the mode of operation of the ground detection system. Since all assets pass through this 'debris field' periodically, attention to these objects is paramount. Because of the orbital speeds and the energy involved, an object only 10 cm long could destroy a satellite, while an object only 1 cm could disable a spacecraft. Smaller objects could also cause significant damage to spacecraft, including disabling vital on-board systems.

NASA recently estimated that more than 20,000 objects currently orbiting around Earth are larger than a softball, more than 500,000 objects currently orbiting around Earth are larger than a marble, and that million more objects are currently orbiting around Earth that are so small they cannot be accurately tracked. Of the objects orbiting around Earth, the greatest concentration of orbital debris is thought to be around 800-850 km from Earth, with most objects orbiting within 2000 km from the Earth. This is the Low Earth Orbit (LEO) range.

The number of orbiting objects makes it difficult to catalog and to track the debris. Additionally, the amount of orbital debris is expected to increase over the next few years and decades.

Numerous types of systems exist or are proposed for the purpose of space object detection and characterization. The proposed systems include ground-based radar, ground-based phased array radar, ground-based optical detection, space-based optical detection, space-based IR detection, and space-based radar. Currently, there are three main Space Situational Awareness (SSA) systems. These include the U.S. Space Surveillance Network (SSN), the European Space Agency's (ESA) Space Situation Awareness Program (Space Surveillance and Tracking—SST), and the International Scientific Optical Network (ISON). Additionally, nations interested or active within space exploration, such as Russia, China, Norway, Australia, India, Japan, South Africa and the UK have or plan to have equipment for surveilling space. The Space Data Association (SDA) includes all the major satellite communications companies, which typically utilize data from SSA systems to protect their assets.

The SSN and SST both comprise two main parts: surveillance and tracking. The surveillance segment monitors a large area of the sky (creates a "fence") and passively waits for objects to pass through that area of the sky (i.e. cross the fence). The tracking segment has a very small field of view and is an active system. Data (orbit parameters) from the surveillance segment are refined by the tracking segment if the rough estimate is accurate enough for the tracker to find it in its small beam. In June of 2014, the U.S. Air Force awarded Lockheed Martin (L M) a $914M contract for a ground-based radar system called "Space Fence". The Space Fence is an upgrade to the existing SSN and consists of two S-band phased arrays. The Space Fence program is slated to run till 2018 and has a potential value of more than $1.5B over an eight-year period.

Each of the existing or proposed SSA systems has drawbacks. Most drawbacks are related to the limited data acquisition abilities of the systems, the inability of surveillance systems to attain precision orbit parameters of newly detected objects, the lack of 24/7 availability (e.g. ground optical systems), and the system costs and complexity. The principal limitation of all present methods is the perceived need to comprehensively search all space, since an arbitrary object at an arbitrary time could be almost anywhere in the sky. Larger aperture sensors, while providing greater sensitivity, narrow the field of view and enlarge the space to be searched. It would be useful to develop a system and method for detecting and determining the orbit for earth orbiting objects that is relatively simple, that is highly accurate, that limits a search to a portion of available space, and that is able to quickly detect and catalog earth orbiting objects.

SUMMARY OF THE INVENTION

In concordance with the instant disclosure, a system and method for detecting and determining the orbit for earth orbiting objects that is relatively simple, that is highly accurate, that limits a search to a portion of available space, and that is able to quickly detect and catalog earth orbiting objects, is presented.

While the method applies in principle to all orbits, it is of particular interest for LEO/MEO objects usually referred to as "space junk". Analysis has shown that this system overcomes the TSA (Too Short Arc) issue seen in other approaches with very short observation time opportunity.

The system and method consists of an equatorial system optimized by horizon pointing with specialized hardware and advanced algorithms. The system and method has particular application to, but is not limited to, small size orbital debris in LILO (Low Inclination Low Orbit) orbits. One embodiment targets objects at altitudes lower than 1000 km, all inclinations, and one to three centimeters in diameter for a 100% discovery rate after just one year.

In one embodiment, a system for detection and orbit determination of Earth orbiting objects includes a first plurality of sensors including at least one first antenna. The at least one first antenna is configured to point in a stare mode to broadcast a first detection signal at an angular region centered on an equatorial plane to maximize detection of orbiting objects regardless of altitude, grade, or inclination. In one embodiment, the first antenna is configured to stare at a low inclination angle. In another embodiment, the first antenna is configured to stare at one of due east and due west along the equator. In another embodiment, the at least one first antenna is located ±10° of latitude relative to the equator.

In another embodiment, the first plurality of sensors further comprises a widely spaced phased array of large antennas configured to maximize EIRP and G/T.

In another embodiment, the at least one first antenna is a monostatic antenna configured to switch between broadcasting the first detection signal and receiving a second detection signal, the second detection signal comprising at least one return signal created by the first detection signal reflecting off of an Earth orbiting object.

Additionally, the system for detection and orbit determination of Earth orbiting objects may include a second plurality of sensors including at least one second antenna configured to point in a stare mode, monitor an angular region centered on an equatorial plane, and receive a third detection signal, the third detection signal comprising at least one return signal created by a reflection off of an Earth orbiting object. In one embodiment, at least one of the second plurality of sensors is located off of the equator.

In another embodiment, the second detection signal is processed to determine a range and a range rate in relation to a location of the first plurality of sensors, and the third detection signal is processed to determine a range and a range rate in relation to a location of the second plurality of sensors. Post-processing of the second detection signal is applied to determine an Angle of Arrival in relation to the location of the first plurality of sensors, and post-processing of the third detection signal is applied to determine an Angle of Arrival in relation to the location of the second plurality of sensors.

In another embodiment, a third plurality of sensors located up to 10° latitude and including at least one third antenna and configured monitor an angular region centered on an equatorial plane, the third antenna further configured to receive a fourth detection signal, the fourth detection signal comprising at least one return signal created by a reflection off of an Earth orbiting object. The third antenna may be part of a multistatic array.

BRIEF DESCRIPTION OF THE DRAWINGS

The above, as well as other advantages of the present invention will become readily apparent to those skilled in the art from the following detailed description of the preferred embodiments when considered in light of the accompanying drawings, in which.

DETAILED DESCRIPTION OF EXEMPLARY EMBODIMENTS OF THE INVENTION

The following detailed description and appended drawings describe and illustrate various exemplary embodiments of the disclosure. The description and drawings serve to enable one skilled in the art to make and use the disclosure, and are not intended to limit the scope of the disclosure in any manner. In respect of the methods disclosed, the steps presented are exemplary in nature, and thus, the order of the steps is not necessary or critical, unless otherwise disclosed.

The present invention can be viewed as both a supplement to the ground SSN system as well as a novel way to handle the functionality of both the surveillance and tracking segments. As a supplemental system, the present invention is able to find and determine orbit parameters (to a few cm per second) of objects missed (especially Low Inclination Low Orbit, or LILO) by even the newly proposed Lockheed Martin system, which will be located at Kwajalein Atoll in the Marshall Islands about 9 degrees off the equator (8.7167° N, 167.7333° E). As discussed below, the effectiveness of the present invention may be demonstrated using COTS software, AGI's STK, ODTK and Mathwork's Matlab and the inventive algorithms. Observations made by the present inventive system can be passed on to the SSN catalog data base for targeting or for further orbit parameter refinement. As a novel way to handle surveillance and tracking, the inventive system is able to use a small field-of-view beam for surveillance (rather than tracking), providing high precision orbit parameters despite the short time the object is in the beam due to a novel uplink array technology and specialized hardware and algorithms. Current state-of-the-art cannot do this because of the array location, the array staring angle, and the inability to get high precision orbit determination during the very short time the object passes through the beam (called the too short arc—TSA problem). Instead, state-of-the-art systems look up like a fence, record detections, determine if the detected objects are in the catalog, and either enter rough orbit parameters for a new object or refine the parameters of a known object.

Accordingly, the present invention provides a system and method to identify and characterize debris orbiting the Earth. Orbit detection and characterization requires solving for six parameters, object position [x, y, z] and velocity [$\dot{x}$, $\dot{y}$, $\dot{z}$]. As noted above, the predominance of orbital debris is in Low Earth Orbit (LEO), and in Mid Earth Orbit (MEO). It has been determined that, for LEO/MEO orbital debris and active satellite detection, the best nominal antenna location is at or very near the equator. The best nominal antenna pointing is staring at very low elevation, either due east or due west, within the equatorial plane.

All persistent satellites, including orbital debris, must cross the equatorial plane repeatedly while they remain in orbit. This fact is a natural consequence of the Earth's rotation. Thus, if a sensor were to be placed in a fixed location on or very near the equatorial plane and configured to be staring or scanning within this plane, nearly all orbiting objects would eventually cross within the sensor's beam. It is understood that the phrase "on or very near the equatorial plane" as used in the Specification means a location of 0° latitude, plus or minus 10° (0° latitude, ±10°). It is further understood that the system effectiveness improves the closer the sensor is to the actual equator. However, if the sensor is configured to stare or scan within a relatively high scanning angle relative to the horizon, such as with an overhead "fence" type scan, the range to the object is diminished but, due to the properties of the scanning beam and the speed of the orbiting object, the orbiting object will be in view for detection for a short period of time when it crosses the equatorial plane where the sensor is pointed. Moreover, at a given moment, several additional objects with a range of inclinations and altitudes may simultaneously be present, but unless the orbiting objects all pass within the high angle sensor beam, the additional objects will not be detected.

However, according to the present invention, when a sensor is placed on or very near the equator and is configured to stare or to scan at a low elevation angle, detection of orbiting objects is enhanced. It is understood that the phrase "low elevation angle" as used in the Specification means an elevation angle of 20° or less with respect to the horizon. Optically, a low scan angle beam travels a longer distance to reach any objects in LEO/MEO. In one embodiment, the equatorial plane is monitored by a sensor pointed to a low elevation angle, either due east or due west oriented. Optically, due to the properties of the scanning beam and the speed of the orbiting object, low altitude objects will remain within the beam for an extended duration due to a slanted beam projection just before or after eclipse of the orbiting object by the Earth. Because orbital debris is not actively station-kept (i.e. geosynchronous), its ground track will drift, and thus will eventually be in view of a staring sensor.

Figure 1:
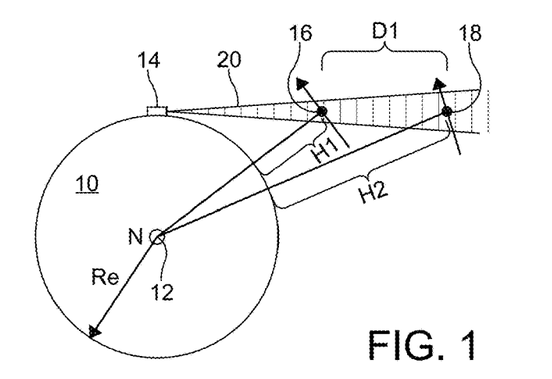
FIG. 1 is an illustration of a preferred system geometry for a system and method for detection and orbit determination of earth orbiting objects, according to an embodiment of the disclosure.
Figure 2:
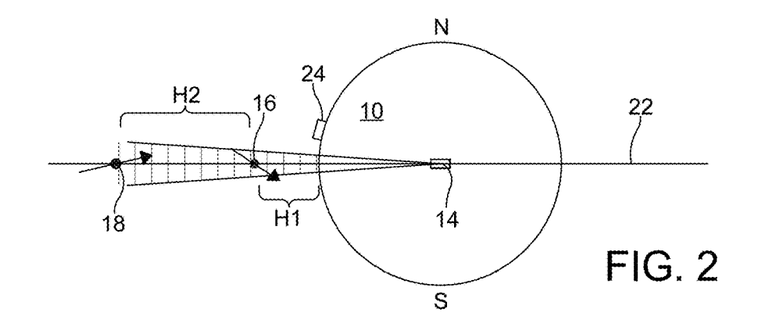
FIG. 2 is a preferred system geometry of FIG. 1 as viewed from the equator.

The inventive configuration of a sensor placed on or very near the equator scanning or staring at a low elevation angle is demonstrated in FIGS. 1 and 2. The Earth 10 is viewed with its North Pole 12 in the center as seen from above in FIG. 1, while the Earth 10 is viewed with a first sensor array 14 in the center as seen from above the equator in FIG. 2. The first sensor array 14 is located on or near the equator, represented as the outer circumference of the Earth 10 as viewed from above the North Pole 12. Improved results have been achieved when the first sensor array 14 is located within 2° of the equator. Antennas of the first sensor array 14 are pointed westward just above the horizon of the Earth 10 emitting a beam 20. It is understood that the antennas of the first sensor array 14 may also be pointed eastward without affecting the operation of the system. According to the present invention, the first sensor array 14 monitors a narrow angular region (e.g., sensor beamwidth) centered on the equatorial plane 22, providing eventual access to almost every LEO/MEO object regardless of altitude or inclination. Further, with exception of station-kept synchronous orbits, i.e. geostationary orbits or geosynchronous (periodic exact ground path retracing orbits), the first sensor array 14 may be staring as opposed to scanning, providing an enormous simplification to existing systems. It is noted that synchronous station-kept orbiting satellites (which do not drift appreciably in longitude) can be addressed with slow elevation-only scanning, and as a result, for a ground-based sensor application, detection of geo-stationary objects will require (at least) a second system in the other hemisphere and elevation scanning.

In FIGS. 1 and 2, a first orbital object 16 in LEO and a second orbital object 18 in MEO are shown crossing the equatorial plane 22. The LEO object 16 has a height H1 above the Earth, and consequently, has an orbital radius of Re+H1, where Re is the radius of the Earth. The MEO object 18 has a height H2 above the Earth, and consequently, has an orbital radius or Re+H2. The beam 20 may be traversed by the LEO object 16 or the MEO object 18 from north to south (or vice versa) due to orbital inclination, as best seen in FIG. 2. Due to the beam characteristics, both the LEO object 16 and the MEO object 18 experience a prolonged duration within the conical beam 20 due to its slanted orbital path through the beam.

In particular, arranging the beam 20 on the equator staring or scanning at a low inclination angle on the horizon provides about nine times more coverage time to the faster moving LEO object than available with an overhead "fence" view and at the same time minimizes the radar range variation D1 from closest to most distant object. Because of geometric projection, a LEO object 16 will be in the beam 20 longer, somewhat compensating for its higher orbital speed, which ultimately takes the LEO object 16 out of the beam. Additionally, range variation D1 is reduced since LEO objects 16 are seen at an extreme slant while MEO objects 18 are seen more nearly at range slightly greater than their height H2. Additionally, objects with inclination near zero degrees persist in the beam 20 longer since the Earth rotates in the same direction as the object, whereas objects with inclination near 180 degrees are moving against the rotation of the Earth, and thus exit the beam sooner.

The beam arrangement of the present invention also helps with maximizing duty cycle (set by round trip differential delay of the beam 20) and reduces the dynamic range of returned power due to a given sized object at range extremes. Importantly, beam area for detecting LEO objects is about 81 times larger at the slant range than overhead, greatly improving the probability of detection of fast moving LEO objects. Moreover, analysis has shown that the beam arrangement of the present invention contributes to mitigating the Too Short Arc (TSA) issue seen in other approaches with very short observation time opportunity because the LEO or MEO object remains within the conical beam 20 for a longer period of time. Other contributors to mitigating the TSA issue include the high EIRP and high SNR of the array, and precision measurements of azimuth, elevation, range, and range rate. Precision measurements are realized due to very wide bandwidth signal processing for high accuracy range/range rate, state-of-the-art AOA methods for high azimuth/elevation resolution, and large D/λ, array for high accuracy AOA (thus cross-range).

It is notable that only the equatorial plane has this observation advantage. As the viewing direction moves away from the equatorial plane, fewer and fewer objects are certain to eventually cross the viewing direction, and two-dimensional scanning is required. Searching for objects in the equatorial plane, but from a perspective off that plane, yields only objects within a particular limited range of altitude and inclinations. However, with continued interest in LILO objects due to their threat to all assets, even if a suitable location on the equator is not feasible in certain applications, a sensor may still be placed at an off-zero latitude pointed at low elevation toward the equatorial plane. In one embodiment, shown in FIG. 2, at least one second sensor array 24 is placed at up to 10° latitude pointed to monitor an angular region centered on an equatorial plane. While this arrangement compromises the detection of higher altitude low inclination objects, it maximizes the visibility of LILO objects subject to the off-equator constraint. The off-zero latitude sensor may be configured as a send/receive sensor or as a receive only sensor, and may be used in conjunction with the monostatic sensor 14 located on or very near the equator. The off-zero latitude sensor may also be part of a multistatic array of sensors, as described below.

In one embodiment, when operated with the first sensor array 14, the at least one second sensor array 24 forms multiple beams simultaneously. That is, the at least one second sensor array 24 must have a broad element pattern and multiple beam-formers with different starting and time delays. Optionally, the at least one second sensor array 24 may wait idle until the first sensor array 14 detects something, and then, based on instructions received due to beam processing of the signals sent and/or received by the first sensor array 14, the at least one second sensor array 24 forms a beam toward the detected object. In this embodiment, the combined sensing by the first sensor array 14 and the at least one second sensor array 24 provides all the required orbit parameters immediately—position and velocity.

Finally, within the class of orbits designed to periodically retrace the same ground locations, these periodic exact ground path retracing orbits may not ever pass within the conical beam 20 when the conical beam 20 is at a low inclination angle. However, with the placement of the array 14 on the equator, the beam 20 need only be scanned in elevation up to a maximum of 90° of inclination to capture the Ground Track Orbits of certain orbiting objects. Advantageously, there is no need to scan the sensor in azimuth out of the equatorial plane. As a result, the scanning requirements of an array placed on or very near the equator aimed due east or due west in the equatorial plane results in greatly reduced search dimensionality requirements.

By way of example only, one possible beam 20 consists of a binary PSK pseudo random sequence. However, it is also possible to use many different choices, as, for example, a wideband chirp. A transmitter frequency of 10 GHz and a chip rate of 100 Ms/sec will give a range resolution of less than 3 m, and possibly close to 1 m, depending upon the signal to noise ratio (SNR). Range rate is given by Doppler shift and will be in the order of 400 kHz for LILO objects, depending upon range and inclination. In the illustrated system of FIGS. 1 and 2, a transmitter pulse duty cycle is controlled so that the transmitter pulse lasts until the return pulse is expected from the LEO object, in this example just under 10 ms. After the 10 ms transmitter pulse, the sensors 14 switch to receive until the return pulse can arrive from the most distant object considered, about 25 ms in this example. Thus, the cycle period is about 35 ms and the duty cycle is about one third (10 ms/35 ms total).

In one exemplary embodiment, an array consisting of 12 m reflector antennas operating at 10 GHz will have a LEO object within the element pattern beam for about 700 ms to 2000 ms. 700 ms of beam exposure is sufficient for 20 cycles of measurement, while 2000 ms of beam exposure allows for up to 57 pulse measurements.

The frequency of the beam 20 also may be reduced to improve the duration of the exposure to a LEO object within the element pattern beam. For example, the beam may operate at 2 GHz, which would provide observation durations about 25 times longer. However, a 2 GHz beam would reduce range and range rate accuracy by a factor of 5 (10 GHz/2 GHz) while increasing the minimum size object that can be detected by about the same factor. During the longer observation time, a LEO object will move many kilometers and the Doppler frequency can change by hundreds of Hz. While this is useful in obtaining more diversity in measurements for orbit determination, it makes coherent integration of pulses difficult. Ideally, a conservative design would depend upon SNR high enough for single pulse detection.

Due to the range to fourth power dependence for radar target detection, very high radiated power and very sensitive receivers are needed to sense small, distant objects. It can be shown that the signal to noise ratio, SNR of an array antenna having N identical elements each with aperture area $A_e$ and each fed by a power amplifier with output $P_a$ is given by:

$$SNR = \frac{N^3 P_a A_e^2 f^2 \sigma}{kT_a B(4\pi c^2) R^4} \quad \text{Equation 1}$$

where f is frequency of operation, c is the speed of light, R is range from the radar to the object of interest, $\sigma$ is the cross section of the object (area) which intercepts the radar transmission and is assumed to scatter isotropically. B is processing bandwidth (inverse of the waveform integration time), $T_a$ is the system temperature of the array when receiving and k is Boltzmann's constant. In a Bi or Multi static configuration, $R^4$ is replaced by $R_T^2 R_R^2$ where the T and R subscripts refer respectively to transmitter and receiver to target range and $A_e^2$ e is replaced respectively by the product of transmitter and receiver array element areas, $A_{eT} A_{eR}$. If the number of antennas in the receive array differs from those in the transmit array, $N^3$ is replaced by $N_T^2 N_R$.

Use of an array is attractive because of the $N^3$ dependence on the number of antenna elements (transmit array gain increases by N; since each antenna is also individually powered, total power transmitted increases by N as well; and finally, receive array gain is proportional to N—thus the $N^3$ dependence), as is the fact that transmitter power can be independently supplied at each element. These advantages are in addition to the usual array benefits such as graceful degradation with failure, and dynamic reconfiguration potential.

Figure 3:
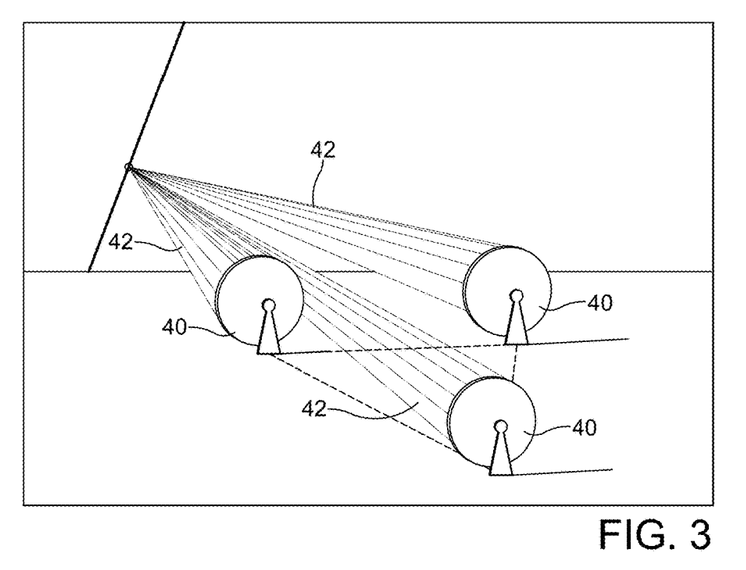
FIG. 3 is a diagram of a notional three-reflector array for the system and method for detection and orbit determination of earth orbiting objects, according to an embodiment of the disclosure an array of three antennas pointing toward the equatorial plane.

There are additional available methods to improve the performance of the system for detection and orbit determination of Earth orbiting objects. For example, it is known that radar performance improves as the number of array antennas cubed. Therefore, a first method to improve the performance of the system would require additional radar antennas. As a non-limiting example, one embodiment of the invention relies on three, widely spaced antennas, which would provide 27 times greater performance over a single antenna. Such a three-reflector array is shown in FIG. 3. Three reflectors 40 are arranged on or very near the equator with beams 42 staring at a low inclination. Each of the reflectors 40 is roughly 12 m in diameter with full azimuth/elevation positioning capability to allow for tracking or scanning, even though they are envisioned to be staring at a low angle of inclination just above the horizon most of the time. The three reflectors 40 are positioned on deliberately scalene triangle vertices to achieve widely spaced reflectors. It is understood that the term "widely spaced reflectors" means that the reflectors are positioned at least 2000 wavelengths from each other. Thus, for example, the scalene triangle has sides that are about 60 m in length or more. Widely spacing the reflectors 40 helps in achieving very high resolution AOA. Avoiding regularity in positioning helps resolve grating-like ambiguities over the entire field of view.

In one embodiment, each antenna is configured to radiate 1000 watts of power using a combination of two (or four) lower power air-cooled amplifiers. At a transmission frequency of 10 GHz, each antenna has more than 60 dB gain, so the three-element array EIRP will be about 100 dBW. G/T can be improved with modest cryogenic cooling. Despite such very high value of radiated power, there is no accidental radiation safety issue. A 12 m antenna has a projected surface area of about one million square centimeters. Assuming uniform illumination, the 1000 Watts of power radiated is uniformly distributed over the aperture, giving a power density of one milliwatt per square cm at the aperture itself. Safety guidelines allow 10 mw/sq cm, so a person standing in the aperture in the near field would receive an order of magnitude less than allowable exposure. Whole body exposure of a 2 m square person would be only 20 Watts, a heat input, more than an order of magnitude less than standing in sunshine Since this is a near-field situation, the coherent array beam (combining power from all reflectors) does not form until many kilometers away after range loss makes the energy negligible from an exposure perspective.

Adding reflectors to the array is relatively easy, since most of the signal processing hardware remains unchanged. Ideally, as noted above, performance improves as the number of antennas cubed, $N^3$. With everything held constant except N, object cross section and range, one can write $$\frac{N^3 \sigma}{R^4} = \text{constant},$$

Thus $$\frac{N_2}{N_1} = \left[\frac{R_2}{R_1}\right]^{4/3} \left[\frac{\sigma_1}{\sigma_2}\right]^{1/3} = \left[\frac{R_2}{R_1}\right]^{4/3} \left[\frac{a_1}{a_2}\right]^{2/3} \quad \text{Equation 2}$$

where a is the object diameter. For example, the three-element array can detect a 3 cm diameter object at 1000 km, so a 40 element array is expected to realize the same detection performance for a 30 cm object at geosynchronous altitude.

A second way to improve the performance of the system for detection and orbit determination of Earth orbiting objects is to apply simultaneous dual frequency radar detection. The return signals from two different frequencies exhibit different properties. Data can be combined from returns of each frequency, and calculations would increase in accuracy. Thus, dual frequency operation provides extra information about the object, and allows for precisely characterizing orbiting objects.

As a non-limiting example of a dual band feed arrangement, the nominal three-element array of FIG. 3 could simultaneously (or alternately) be operated at a lower frequency to extend the duration of an encounter. Allowing SNR performance to remain constant as frequency and object size vary gives $f^2 a^2$=constant. Therefore if minimum object size is allowed to increase from one cm to 10 cm, then a frequency of operation can be lowered from 10 GHz to 1 GHz, providing a Field of View (FOV) 100 times larger and increasing encounter duration by about 10 times (7 to 20 seconds). Lower frequency of operation may also be valuable in that some LEO objects will have a larger cross section; however unless cross section increase more than offsets sensitivity loss, there will be no advantage gained.

Of course, there are drawbacks to a dual frequency approach, since Doppler shift and antenna AOA accuracy are reduced by the same 10:1 factor. Due to bandwidth limitations at the lower frequency, the PN chip rate will also need to decrease by about 10:1. The net result is increased time for object detection, but at the cost of a 10:1 minimum object diameter size increase and a 10:1 reduction in precision of range, range rate, azimuth and elevation determination, thus 10:1 reduction in orbit parameter accuracy.

A third way to improve the performance of the system for detection and orbit determination of Earth orbiting objects is to optimize processing of the return signal. One signal processing method is described with reference to FIG. 4. Beginning at the antennas 40 in the upper left of FIG. 4, in each antenna a Transmit-Receive switch (not shown) in the feed disconnects the transmit High Power Amplifier HPA (not shown) and connects to a Low Noise Amplifier LNA (not shown) in the receive chain. During the listen interval of the duty cycle, received signals 50 are sent from the LNA through optical fiber to a central processing facility 52. The analog receive signal 50 is a high frequency signal, and includes a pseudo noise (PN) modulation. The receive signal 50 needs to be separated from the RF carrier and into digits at baseband. Downconversion from RF (nominally X-band) to an intermediate frequency (IF, several hundred MHz) is accomplished at a central processing facility 52. After downconversion, the IF signals 54 are at a low enough center frequency that they can be digitized using A/D converter 56. A special (but common) form of digitization converts the "real" IF waveform to a series of complex numbers at "baseband" (zero frequency). To satisfy Nyquist, more than 100M complex samples/sec are needed to represent the 100 MHz bandwidth pulse transmitted. After digitization, the received RF signals 50 consisting of pulse information modulated onto a 10 GHz carrier have been downconverted to zero frequency, removing the carrier and leaving only the information expressed as three strings of complex numbers 58 at a rate of about 100M samples/sec, one string from each antenna. A digital beamformer 60 combines the three strings 58 into one by multiplying each string by its associated beamforming weight (a complex number, applied at the sample rate to the data stream) and summing, again at the sample rate. This 'beamforming' operation of weighting and summing produces the array output, a single stream of complex number samples 62 to be processed. Notably, the default beam steering is the same as the transmit beam, even though targets might be located anywhere in the main beam region. Although the receive beam may be electronically steered through adjustment of the beamforming weights, no pointing vector is known. For this reason, all of the inputs, represented by the three strings of complex numbers 58, are stored in a buffer 64, so that after a signal is detected with the default settings, post processing can provide an optimum beam as well as AOA (Angle of Arrival) information about the target. Realistically, the system would incorporate dual polarization, but to simplify explanation, only a single polarization is described.

Figure 4:
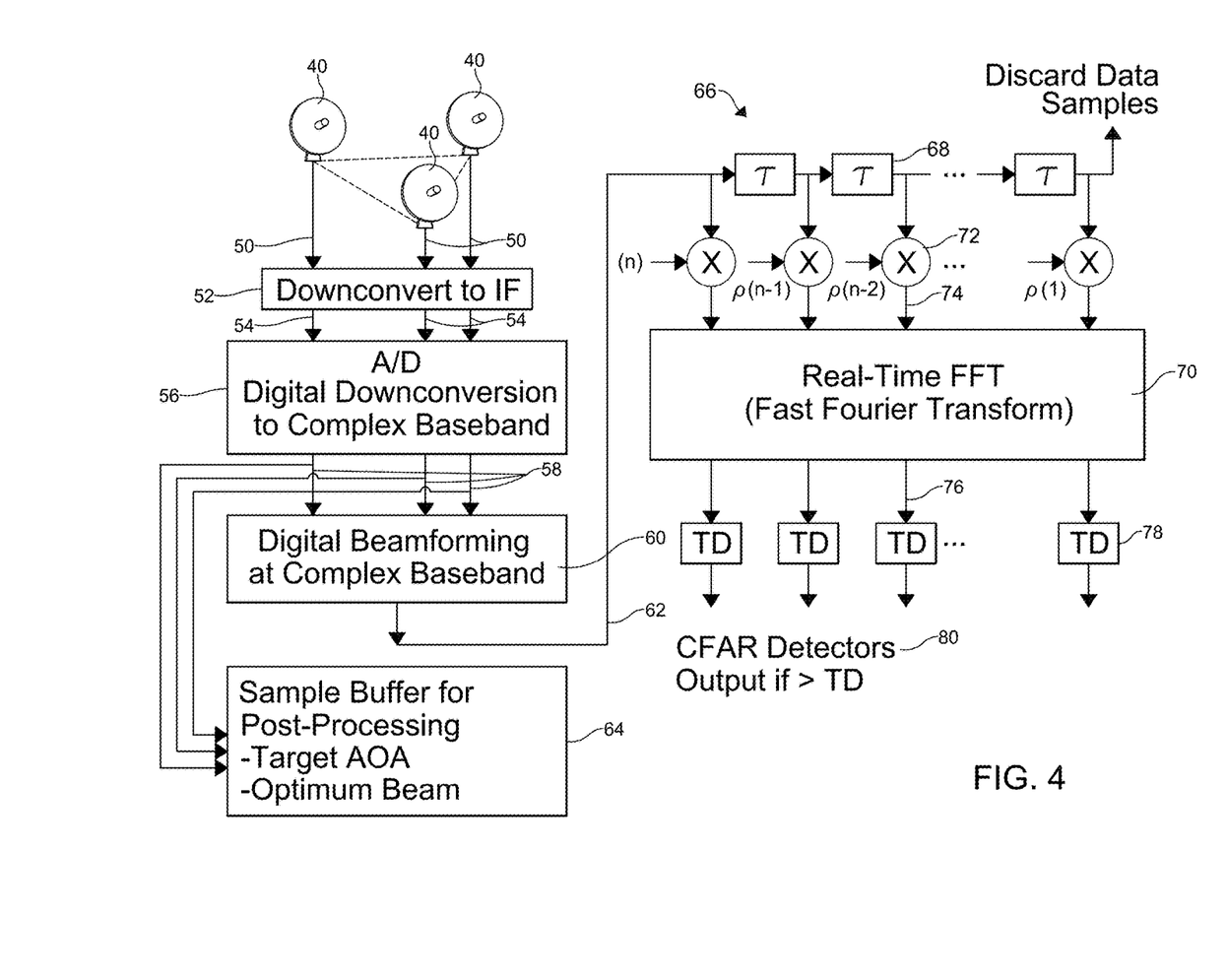
FIG. 4 is a block diagram of signal processing flow for a system and method for detection and orbit determination of earth orbiting objects, according to an embodiment of the disclosure.

At this point, reflected energy from targets is buried in noise (typically 50 to 60 dB below). Somehow, an arrival time of the reflected energy from targets needs to be determined, and a Doppler shift measured to provide the velocity of the target. Together this information yields the target's range and range rate. Later, when combined with the AOA, we will have four of the six values needed to determine an orbit (Object 3-D position and a Line of Sight (LOS) velocity). Thus, in a monostatic system, orbit determination requires at least two pulses. A 3-D position and 3-D velocity will be finally determined from processing subsequent pulse returns. Typically we will process dozens of pulses and obtain a minimum mean squared error estimate.

The single stream of complex number samples 62 is sent to a combination of a transversal filter 66 (a tapped and weighted delay line) and a FFT processor 70 to provide matched filtering and detection. As a non-limiting example, a very weak return from a target may be spread over about 10 ms time (matching the transmitted signal), Doppler shifted away from the transmitted frequency and arriving at an unknown time due to range dependency. Samples 62 from the array's beam flow into the transversal filter 66. All samples 62 are advanced one position as new samples arrive based on the sample time delays 68 (in this case, at a rate of 100 Ms/s, every 10 nanoseconds). As each sample 62 is advanced through the delay line, eventually the received 10 ms duration pulse will just fill the delay line 68, with an earliest PN sequence chip at the far right and the last at the far left. These samples are multiplied bit-wise by the PN sequence 72, exactly canceling the spreading. If there were no Doppler shift, the filter output values 74 could simply be summed, resulting in an impulse at a time corresponding to the two-way range to the target. Instead, the Doppler shift due to target motion results in the filter output values 74 providing a 10 ms samples of a Doppler shifted sine wave. In one method, a bank of narrow band filters could be constructed, the output of which would be examined for a signal.

Figure 5:
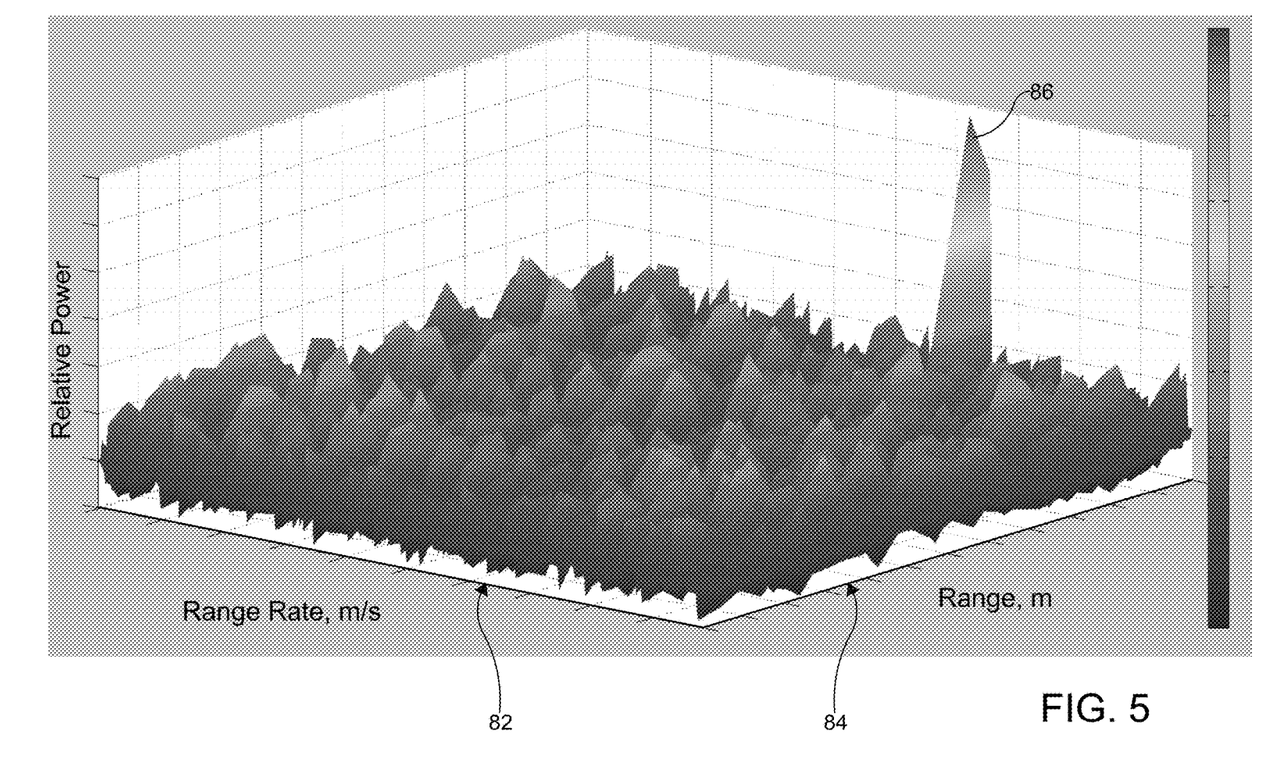
FIG. 5 illustrates how pulses at the threshold of detection appear as they are received from an object as it moves through the main beam as a function of range and range rate (expressed as Doppler shift), applying the system and method for detection and orbit determination of earth orbiting objects according to an embodiment of the disclosure.

In the method shown in FIG. 4, the filter output values 74 are sent to a real-time FFT processor 70, which converts the time-domain input to a frequency-domain output 76. For N inputs 74 (about one million, 100 Mc/s*10 ms=1M), we will get 1M outputs 76. Since the input bandwidth was about 100 MHz, each of the outputs 76 will have a frequency resolution of about 100 Hz. One of the FFT outputs 76 (at the Doppler shift frequency) will peak within at least one sample time, thus simultaneously indicating both the range and range-rate. FIG. 5 shows a representation of peaked signal at a particular value of sample time and frequency, plotted as Doppler Bins 82 (shown as Range Rate against the Sample Times 84, which also indicates Range to the target. One bin 86 exceeds detection threshold, and indicates a potential target. The map shown in FIG. 5 is a very small section of the entire surface, since the entire surface would comprise about 1M×2.5M over the duration of the 'listening' interval of the duty cycle.

From a processing perspective in FIG. 4, target detection is obtained with a bank of threshold detectors 78, one for each frequency bin output of the FFT. When a target return aligns with the transversal filter, one of the threshold detector frequency bins 78 will have an output appreciable greater than the noise level (6 to 10 dB at threshold). The threshold detectors 78 provide an output whenever a signal is present. A Constant False Alarm Rate (CFAR) algorithm 80 is applied to the channel, as is standard practice in Radar.

Once a target 86 (FIG. 5) is detected, the Angle of Arrival (AOA) of the target can be determined by post-processing the unprocessed inputs stored in buffer 64 (FIG. 4). For post-processing, the PN sequence must be wiped off, and Doppler filtered, but this can be accomplished with an ordinary digital computer since the correct time delay and the Doppler shift are already known from the detected target 86. Once the array inputs are thus despread and filtered, their covariance can be calculated yielding a steering vector and subsequently AOA. A single measurement, therefore, provides 3D position of the potential target, and a line of sight velocity (Doppler). In other words, a single measurement provides four of the six parameters needed for orbit determination. Additional measurements are required to determine an orbit. According to the invention, by placing the detection signal at or very near the equator at a low inclination angle, the object remains within the detection signal for sufficient time that at least one second measurement may be made, which will then resolve three dimensional velocity as well. Ultimately, over the duration of the encounter, Doppler vs. time may be resolved to a few Hz (for the 10 GHz carrier) in order to obtain a velocity error of a few cm/sec. This requires some form of combining the multiple pulse observations. SNR of Post detection combining improves almost linearly with the number of samples if the samples each have positive SNR. Consequently, given a target that is detectable with a single pulse (8 to 10 dB SNR threshold), effective SNR improves by approximately 13 to 18 dB, giving 21 to 28 dB results. Measurements are not directly averaged but are combined using algorithms such as AGI's ODTK (orbit determination toolkit).

Accordingly, in one embodiment of the invention, object detection and characterization is improved using a wideband waveform (PN) and signal processing that permits independent measurement of precise range/range-rate, which is crucial for proper orbit determination. It is understood that other waveforms, particularly chirp, are known in radar but are less desirable due to range/range-rate coupling.

Figure 6:
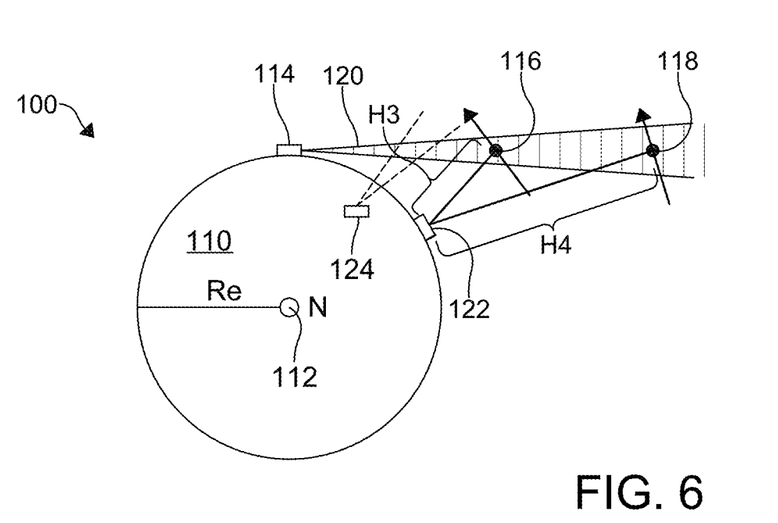
FIG. 6 is an illustration of a preferred system geometry for a system and method for detection and orbit determination of earth orbiting objects illustrating a multistatic staring array geometry for the system, according to an embodiment of the disclosure.

In another embodiment shown with reference to FIG. 6, a preferred multistatic system 100 is illustrated. The Earth 110 is viewed with its North Pole 112 in the center as seen from above in FIG. 1. A first sensor array 114 is located on the equator, represented as the outer circumference of the Earth 110 as viewed from above the North Pole 112. Antennas of the first sensor array 114 are pointed westward just above the horizon of the Earth 110 emitting a beam 120.

According to the present invention, the first sensor array 114 monitors a narrow angular region (e.g., sensor beamwidth) centered on the equatorial plane, providing eventual access to almost every LEO/MEO object regardless of altitude or inclination. Further, with exception of station-kept synchronous orbits, i.e. geostationary orbits or geosynchronous (periodic exact ground path retracing orbits), the first sensor array 114 may be staring as opposed to scanning, providing an enormous simplification to existing systems. It is noted that synchronous station-kept orbiting satellites (which do not drift appreciably in longitude) can be addressed with slow elevation-only scanning of the first sensor array 114, and as a result, for a ground-based sensor application, detection of geo-stationary objects will require (at least) a second system in the other hemisphere and elevation scanning.

In one embodiment, the first sensor array 114 is a transmit array conceptually similar to that given in FIG. 1 and is located on the equator. Reflector antennas in the first sensor array are pointed westward just above the horizon. It is understood that the reflector antennas may be pointed eastward instead of westward, as described above. A first orbital object 116 in LEO and a second orbital object 118 in MEO are shown crossing the equatorial plane. The LEO object 116 has a height H3 above the Earth 110, and consequently, has an orbital radius of Re+H3. The MEO object 118 has a height H4 above the Earth, and consequently, has an orbital radius or Re+H4. The beam 120 may be traversed by the LEO object 116 or the MEO object 118 from north to south (or vice versa) due to orbital inclination. The first sensor array 114 optionally may be a monostatic sensor array, meaning that it can both transmit and receive a detection signal.

A second sensor array 122 is located on the equator more nearly 'underneath' the MEO object 118. Placement of the second sensor array 122 spaced along the equator from the first receiving station 114 helps equalize sensitivity to a given sized target by increasing the short range from the LEO object 116 while reducing the longer range from the MEO object 118.

Additionally, placement of the second sensor array 122 as a "receive only" station allows an operational choice regarding the first sensor array 114. In one embodiment, the first sensor array 114 may operate as a continuous wave (CW) transmitting station. Since CW transmit energy is distributed along the transmit beam path 120, a second sensor array 122, configured as a receive only facility would be required to have simultaneous coverage along the entire range variation path illustrated in FIG. 6, which is essentially an arc up to 180 degrees above the second sensor array 122 along the equatorial plane. Such simultaneous coverage maximizes the probability that a target anywhere along this range will be detected. It is possible to provide such simultaneous coverage efficiently with a multi-beam phased array receiving antenna.

The illustrated multistatic operation also permits a 100% duty cycle at the first sensor array 114, since the receiving second sensor array 122 is assumed remote and does not receive the transmitter directly. A CW transmitter signal has significant advantages, placing maximum energy on small distant targets while eliminating potential range and range-rate ambiguities by virtue of return signal continuity. For example, significantly improved object tracking (vs. the pulsed monostatic waveform) occurs by fully using the CW waveform. As a non-limiting example, one method would require repetition of the PN sequence every 10 ms, allowing fixed transversal filters and FFT as described in FIG. 4, but with a continual update (without the intervening transmit gap in the monostatic case). No significant range ambiguity is introduced by such PN repetition, since the geometry of necessary transmit receive beam intersection narrowly restricts allowable delay. It is possible to use the same FFT matched filter postulated for the monostatic case (FIG. 4). A return signal would be continuously integrated for maximum sensitivity unlike in the pulsed monostatic case described with reference to FIG. 1.

Multistatic methods are particularly appealing for addressing Low Observable (LO) targets, since scatter in arbitrary directions is more difficult to control than only the incident direction. By suitably locating the receiving site 'under' the most distant target addressed (minimizing up/down range loss), system sensitivity may be more nearly equalized for LEO/MEO targets. As noted previously, searching for objects in the equatorial plane, but from a perspective off that plane, yields only objects within a particular limited range of altitude and inclinations. However, with continued interest in LILO objects due to their threat to all assets, even if a suitable location on the equator is not feasible in certain applications, a sensor may still be placed at an off-zero latitude pointed at low elevation toward the equatorial plane. In one embodiment, shown in FIG. 6, at least one sensor 124 is placed at up to 10° latitude pointed at a low elevation toward the equatorial plane. While this arrangement compromises the detection of higher altitude low inclination objects by the sensor 124, it maximizes the visibility of LILO objects subject to the off-equator constraint. The off-zero latitude sensor 124 may be configured as a receive only sensor, and may be combined with the monostatic sensor 114 located on or very near the equator, and may further be part of a multistatic detection system including the monostatic sensor 114 and the receive only sensor 122. The off-zero latitude sensor may also be part of a multistatic array of sensors, as described below.

On the other hand, a bistatic/multistatic system is significantly more complex than a monostatic one, requiring at least one receive-only facility in addition to the transmit facility. Operations at the two (or more) sites must be synchronized. In the monostatic operation shown in FIGS. 1 and 2, a target return signal is well aligned with the receiving antenna (except for very long RTT), whereas the second sensor array 122 operating as a bistatic receiving site must be prepared to receive echoes from any spatial location along the transmitted beam. "Pulse chasing" receive beam steering is of little or no value in this application. Since the transmit waveform is unlikely to be a very short pulse (impulse), any significant duration transmitted signal (e.g. 10 ms spread spectrum or CW spread spectrum) will be distributed in space along the transmit beam. Consequently the second sensor array 122 operating as one or more receive site will need a large number of simultaneous beams focused along the transmit signal path.

Accordingly, in another embodiment, it is desirable to provide additional receiving sites with one or more monostatic transmit/receive sites. In other words, a first sensor array 114 would operate as a monostatic site, with data buffering and sharing between all remote sites. Additionally, one or more second sensor arrays 122 would operate as receive only sites, again with data buffering and sharing between all remote sites. In one embodiment, a dedicated processing facility receives all data from all sites, buffers the data, and processes the data.

Using one monostatic site with one or more multistatic sites provides the potential for greatly reduced complexity at the receive location. The monostatic site would be operationally used to provide an initial detection of an Earth orbiting object. Because detection of the Earth orbiting object is nearly simultaneous when using the method outlined in FIG. 4, a multi-beam phased second sensor array 122 may be nearly simultaneously told which portion of the range variation path to monitor for signals. Using at least one monostatic target detection facility and at least one multi-static target detection facility, target detection at the at least one monostatic target detection facility would trigger processing buffered data for the same object at the at least one multi-static target detection facility.

The multistatic radar system has the potential for CW transmission and long integration time on a target return. Any received signals would be buffered, and any post processing of the received signals would occur only at receive only sites, and would only be undertaken if an object is detected at monostatic site. Such a system would save the cost of many parallel beamformers and expensive FFT processors.

Figure 7:
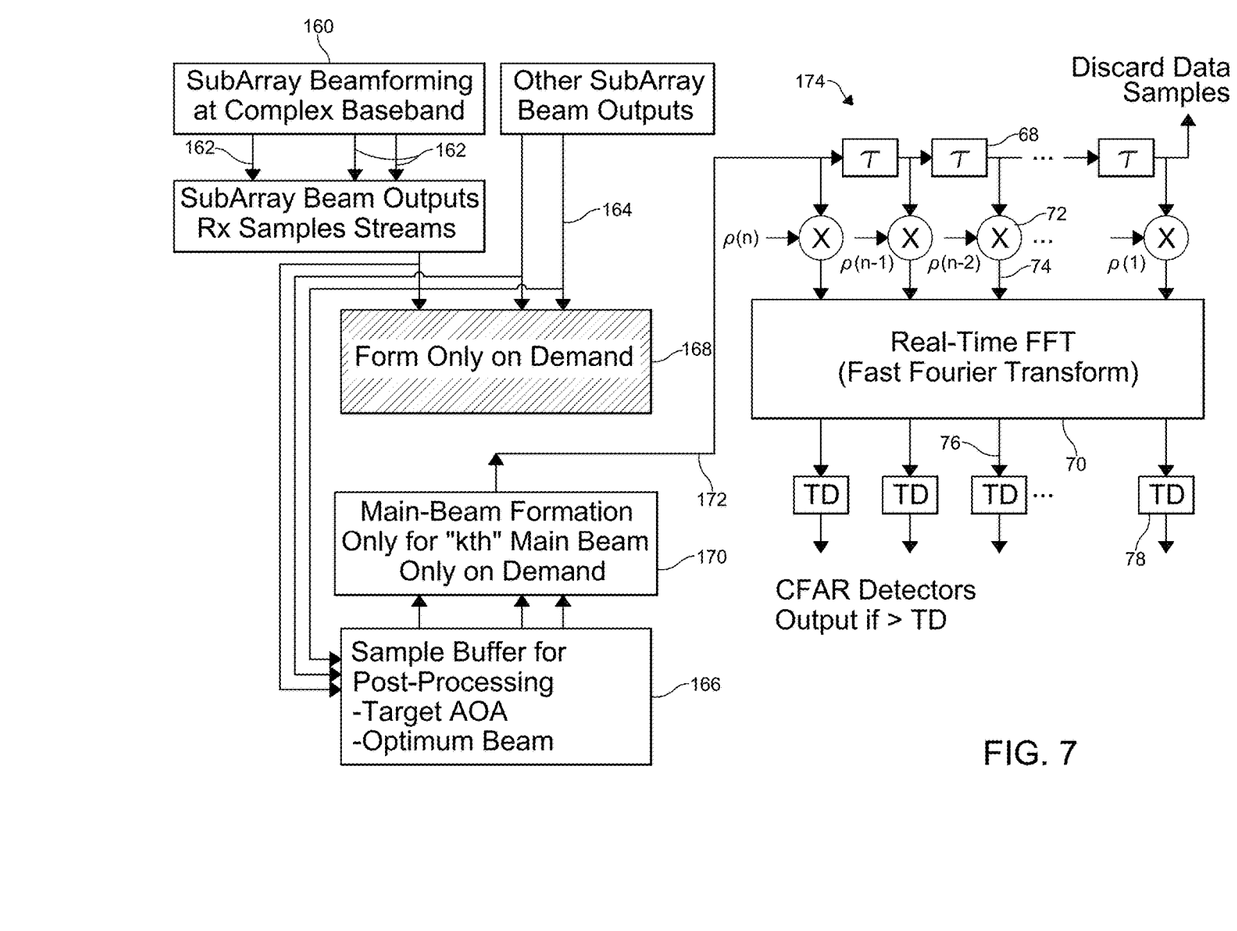
FIG. 7 is a block diagram illustrating signal processing flow of a reduced hardware multistatic configuration for the system and method for detection and orbit determination of earth orbiting objects, according to an embodiment of the disclosure.

A method for synchronously down-converting receive signals from a plurality of individual elements of a receive array is shown with reference to FIG. 7. Each subarray performs digital beamforming 160 to create receive signal sample streams 162 for each subarray that are transmitted to a central processing location 166 that buffers the sample streams 162 for post-processing of target AOA and range covariance, as described previously. Other optional subarray beam outputs 164 are also transmitted to the central processing location 166. As a non-limiting example, the sample streams 162 may be synchronously down-converted to baseband, digitized, and digitally formed into beams, accounting for all necessary beamforming delay via sample indexing or interpolation and phasing by complex multiply. Each of the several subarrays is combined by main beam formation 170 to form the full array receive sample stream 172 (as in the monostatic case of FIG. 4 when the several reflector antennas were combined). The full array receive sample stream is transmitted to a transverse filter 174 that operates similarly to the transverse filter 66 of FIG. 4.

Thus, each received signal from each antenna location is discretely processed to determine a range and a range rate in relation to a location of that antenna. Subsequently, post-processing of each detection signal is applied to determine an Angle of Arrival in relation to the location of that detection signal.

When fully implemented in hardware, hundreds of main beams and associated real-time FFT processors would be required, obviously a significant cost impact. Furthermore, even for millions of centimeter-sized debris, one expects only a few detections per minute, and most of the time all detection hardware is idle. At the expense of potential low-observable target detection where the object could be better detected by the multi-static faculties, optionally, a form on demand protocol 168 may be implemented so that any main beam formation 170 occurs only as a target is detected by a monostatic array. This arrangement, relying on target detection at a monostatic facility, would lead to a much lower cost implementation, because the receive sites would not be fully instrumented. Instead, the subarray data stream outputs could be buffered for a short time and only processed when a target was detected at the monostatic site. This post processing could even be implemented in a general-purpose computer and then only for the beam of interest (which would be known by virtue of the monostatic detection).

In another embodiment, each of the separated first sensor array 114 and the second sensor array 116 (FIG. 6) may utilize different frequencies for tracking, where a lower frequency tracking array may pass information to a higher frequency tracking array to refine the orbit measurements. As a non-limiting example, an X-band array that has detected an object can pass orbit information to a Ka-band tracking array for refinement of the orbit measurements.

Performance Analysis

The performance advantages of this disclosure are illustrated with reference to FIGS. 8A, 8B, 9A, and 9B. Analytical Graphics' Systems Toolkit (STK) was run in the Analyzer mode for satellite orbits ranging in altitude from 160 km to 20,000 km (in increments of about 200 km) with inclinations ranging from zero to 20° (in increments of about 1 degree) and including both prograde and retrograde motion. The total time for each object within the radar beam was determined for a time span of one year as well as other parameters such as slant range, range rate, and line-of-sight angles. The calculations were repeated for different ground station locations and antenna pointing variations, particularly towards the equatorial plane and looking vertically into Space. The results from Analyzer were processed and plotted using Mathworks' Matlab.

A. Performance of a System at 0 Degrees Latitude, Looking Toward the West

Figure 8A:
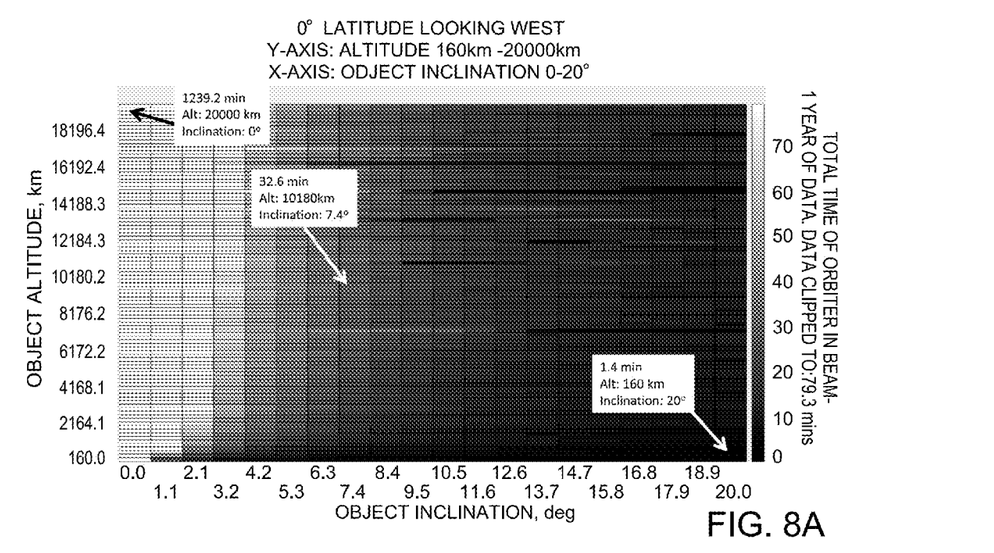
FIGS. 8A and 8B are plots illustrating the results of a performance analysis for an antenna system on the equator pointing west with elevation 5 degrees from Earth surface, according to an embodiment of the invention.
Figure 8B:
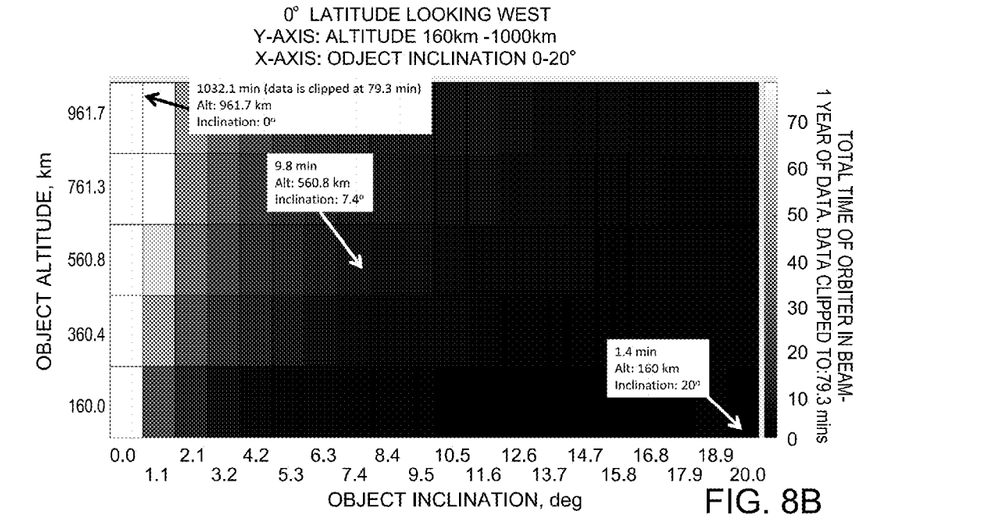

Results for the inventive system located on the equator and for a staring antenna in direction of one embodiment of the invention, toward the western horizon, are provided in FIGS. 8A and 8B. A 12 m reflector antenna was assumed, as was a frequency of 2 GHz. The gray scale at the right of FIGS. 8A and 8B is in minutes, with the darkest gray being about 80 minutes of visibility over a year's time. Although data for all plots were clipped to 80 minutes (FIGS. 8A, 8B) for consistency across coverage maps and ease of comparison (ample time to detect and characterize an object), the actual maximum time for the year, shown in FIG. 8A, is 1239.2 minutes of visibility, and in FIG. 8B, is 1032.1 minutes of visibility. Black shading depicts zero coverage.

In FIG. 8A, object altitude is graphed along the y-axis (ordinate), in this case ranging from 160 km to 20,000 km, while the object's inclination is graphed on the x-axis (abscissa), ranging from zero to 20°. In FIG. 8B, data is shown for only objects having an altitude between 160 km and 1000 km (LEO). FIGS. 8A and 8B demonstrate that the best performance (dark gray) is obtained for low inclination objects, since an object's transverse velocity, a function of the inclination, carries the object out of the beam faster than if the orbit were not inclined.

Although a given object may be in the beam frequently over a year's time, individual passes are comparatively short (on the order of seconds). In an optical observation system, short duration passes would be inadequate, since only angle vs. time can be observed and no meaningful arc variation can be discerned (the TSA—Too Short Arc problem). In contrast, using the inventive system, very high precision range/range-rate as well as high precision azimuth/elevation angle readings are available for each of dozens or hundreds of pulses, each substantially different due to object motion, resulting in excellent predicted performance (velocity errors in the order of cm/sec).

B. Performance of a System at 7 Degrees Latitude, Back Towards the Equator

System performance was also evaluated for an object detection system located at 7° latitude but pointing back towards the equator. Results of the evaluation are shown with reference to FIGS. 9A and 9B. The lack of LILO visibility with a non-equatorial location (FIG. 3) can be mitigated somewhat by pointing the antenna back toward the equatorial plane (again, at low elevation) rather than due westward or due eastward. Low elevation pointing from off of the equator will, of course, lead to blindness for high orbit, low inclination objects, but it may be an acceptable compromise for some applications. Analysis was repeated for a 7° latitude system pointing towards the west and pointing straight up, but is not shown.

Figure 9A:
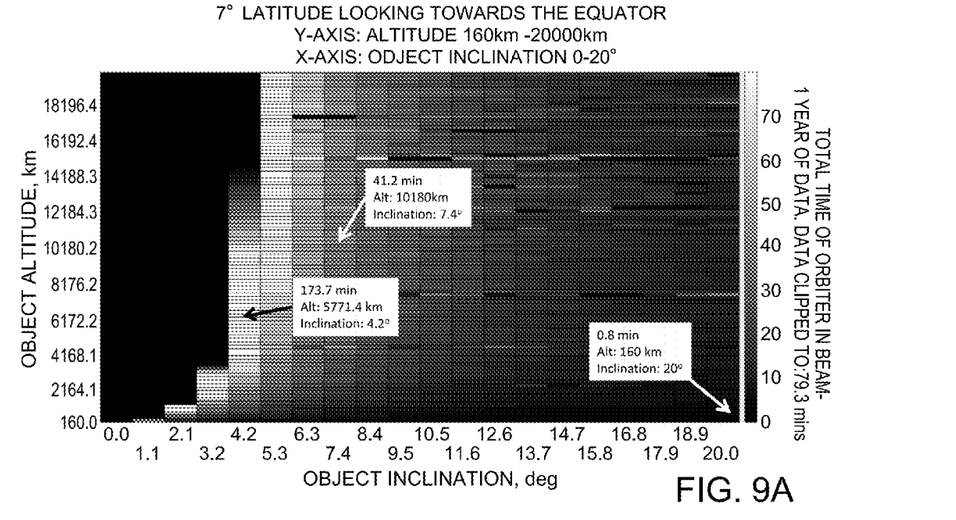
FIGS. 9A and 9B are plots illustrating the results of a performance analysis for an antenna system at 7 degrees latitude is looking back towards the equator.
Figure 9B:
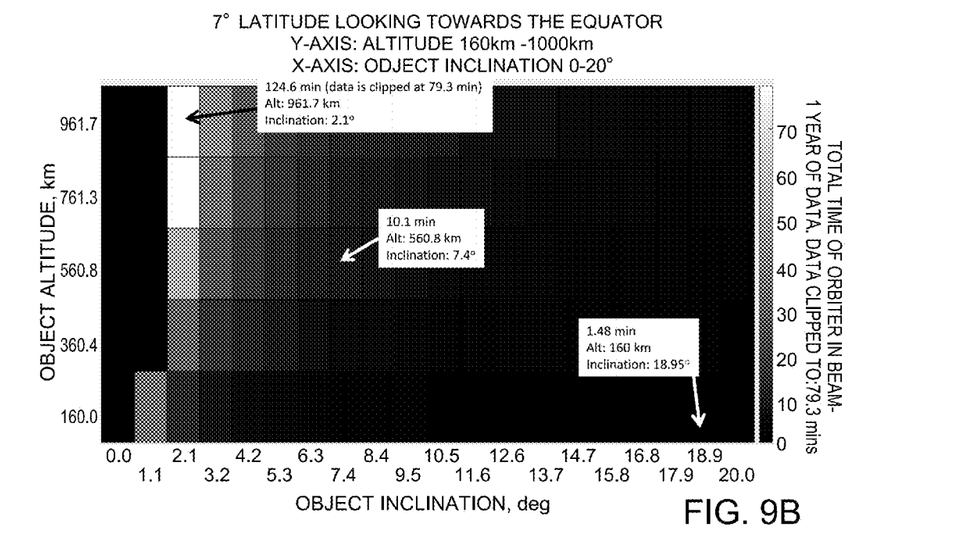

As before, in FIG. 9A, object altitude is graphed along the y-axis (ordinate) ranging from 160 km to 20,000 km, while the object's inclination is graphed on the x-axis (abscissa), ranging from zero to 20°. In FIG. 9B, data is shown for only objects having an altitude between 160 km and 1000 km (LEO). Grayscale values represent an amount of time (minutes in one year of data) that the space object is visible from the evaluated system. Black shading depicts zero coverage. Although data for all plots were clipped to 80 minutes (FIG. 9A, 9B) for consistency across coverage maps and ease of comparison (ample time to detect and characterize an object), the actual maximum time for the year, shown in FIG. 9A, is 173.7 minutes of visibility, and in FIG. 9B, is 124.6 minutes of visibility.

Analysis shows that embodiments of the present invention (FIGS. 8A and 8B) of the Earth-orbiting object detection and characterization system outperforms a system at 7° latitude whether that system is pointed west, towards the equatorial plane, or straight up. Although the performance was calculated for a monostatic radar system, it nevertheless applies for multi-static cases since coverage in any case is dictated by pointing of the transmit beam.

Geo-Synchronous Orbits

From the analysis as shown with reference to FIGS. 8 and 9, it can be seen that LILO object detection is best achieved using the principles of this disclosure: location of the facility on or near the equator, pointing the antenna toward the horizon (low elevation) westward (or eastward), and pointing the antenna back toward the equator at low elevation when location on the equator is not feasible. As noted previously, best results occur when the antenna is located at ±10° relative to the equator, and that performance improves the closer the antenna is to being located on the equator Additional analysis was conducted to determine orbit parameter accuracy. AGI's ODTK, STK, and Analysis Workbench were used in conjunction with Mathworks' Matlab. Start and stop times for objects in the beam of a 12 m dish at 10 GHz were attained. The EIRP was 100 dBW. The G/T was about 46 dB. The azimuth and elevation angle-of-arrival error was about 3e-5 radians. The system was pointed to 5° elevation. The object size was 3 cm at altitudes of 1000 km and 300 km with inclinations of 20 and 2 degrees respectively. Measurements were generated every 0.035 s during the time the object was in the beam (about 5 seconds). The resulting radial, intrack, and crosstrack velocity sigmas in cm/s were 5.93, 3.95, and 2.0 for the 1000 km, 20 degree inclination object and 5.99, 3.97, and 2.0 cm/s for the 300 km 2 degree inclination object. The resulting radial, intrack, and crosstrack position sigmas in meters were 44.5, 28.7, and 19.8 for the 1000 km 20 degree inclination object and 46.3, 15.3, and 10.8 for the 300 km 2 degree inclination object. Thus, the present invention is able to determine orbit parameter accuracy within highly acceptable tolerances.

SUMMARY

Accordingly, the present invention provides a simple, scalable ground-based radar array system for the detection and characterization of Earth orbiting objects. Unlike optical systems, the inventive system can operate 24 hours a day, 7 days a week, rain or shine, day or night. An array of widely-spaced antennas coherently combined to produce a phased array can overcome the other single antenna transmission power limitation, because the transmitted power is distributed among a plurality of antenna elements. The array of widely spaced antennas also mitigates the $1/R^4$ signal power loss that radar suffers from between signal transmission, reflection, and reception.

The inventive antenna array is placed on or very near the equator, which allows objects at any altitude crossing the equator to be in view simultaneously, but discernable due to their radar range dependence. By continuously monitoring the equatorial plane, almost all Earth orbiting objects will ultimately be in view.

Importantly, the present invention provides the ability to derive an objects three dimensional position and a line of sight velocity from a single measurement. Additionally, because the array is pointed at a low inclination angle, any Earth orbiting object will be within a detection window for sufficient time that multiple measurements may be made within the time the object is in view. Therefore, the inventive system allows for full orbital characterization in a single encounter.

The inventive system also effectively utilizes a plurality of larger reflector antennas that provide a cost effective means of gaining a large aperture and having an array scan FOV restricted to that of an individual antenna. The antenna arrays may be arranged in a monostatic or a multistatic configuration. Spacing of each antenna in a multistatic configuration need not be as wide as in the monostatic case, since necessary AOA resolution can be realized by a receive array, reducing grating effects in the transmit beam.

Finally, the inventive system simplifies detection because the receive arrays are configured to stare at a low incidence angle, typically either due east or due west. The receive arrays therefore do not require scan ability. However, if it is desired that the receive array include scan capability, then the receive array need only be capable of single dimension elevation scanning, which permits building the array using inexpensive elements.

From the foregoing description, one ordinarily skilled in the art can easily ascertain the essential characteristics of this invention and, without departing from the spirit and scope thereof, make various changes and modifications to the invention to adapt it to various usages and conditions.

What is claimed is:

1. A system for detection and orbit determination of Earth orbiting objects, comprising:
    a first sensor array including first antennas located within ±10° of latitude relative to the equator, the first antennas pointing in a stare mode to broadcast a first beam including a first detection signal at an angular region centered on the equatorial plane at a low elevation angle to maximize detection of orbiting objects regardless of altitude, grade, or inclination, wherein the low elevation angle is an elevation angle of 20° or less with respect to a horizon, and
    wherein the system receives at least one return signal created by the first detection signal reflecting off of each of the orbiting objects and derives an orbit determination for each of the orbiting objects based on a single pass for the orbiting object through the first beam.

2. The system for detection and orbit determination of Earth orbiting objects as in claim 1, wherein the first antennas are further configured to stare at one of due east and due west along the equator.

3. The system for detection and orbit determination of Earth orbiting objects as in claim 1, wherein the first antennas further comprise a widely spaced phased array of large antennas configured to maximize EIRP and G/T.

4. The system for detection and orbit determination of Earth orbiting objects as in claim 1, wherein the first antennas are further configured to switch between broadcasting the first detection signal and receiving a second detection signal, the second detection signal comprising the at least one return signal created by the first detection signal reflecting off of an Earth orbiting object.

5. The system for detection and orbit determination of Earth orbiting objects as in claim 4, wherein the first detection signal is a simultaneously broadcast dual frequency radar signal.

6. The system for detection and orbit determination of Earth orbiting objects as in claim 4, further comprising:
    a second sensor array including second antennas configured to monitor an angular region centered on an equatorial plane and to receive a third detection signal, the third detection signal comprising at least one return signal created by a reflection off of an Earth orbiting object.

7. The system for detection and orbit determination of Earth orbiting objects as in claim 6, wherein at least one of the second antennas is located off of the equator.

8. The system for detection and orbit determination of Earth orbiting objects as in claim 6, wherein the second antennas are configured as receive-only.

9. The system for detection and orbit determination of Earth orbiting objects as in claim 6, wherein the second detection signal is processed to determine a range and a range rate in relation to a location of the first sensor array, and the third detection signal is processed to determine a range and a range rate in relation to a location of the second sensor array; and wherein post-processing of the second detection signal is applied to determine an Angle of Arrival in relation to the location of the first sensor array and wherein post-processing of the third detection signal is applied to determine an Angle of Arrival in relation to the location of the second sensor array.

10. The system for detection and orbit determination of Earth orbiting objects as in claim 9, wherein the matched filter signal processor calculates at least one of Angle of Arrival, range, and range rate during a single transmit event of the first detection signal.

11. A system for detection and orbit determination of Earth orbiting objects, comprising:
a first sensor array including first antennas, the first antennas located within ±10° of latitude relative to the equator and pointing in a stare mode at a low inclination angle to broadcast a first beam including a first detection signal at an angular region centered on the equatorial plane to maximize detection of orbiting objects regardless of altitude, grade, or inclination, wherein the low elevation angle is an elevation angle of 20° or less with respect to a horizon, and
wherein the system receives at least one return signal created by the first detection signal reflecting off of each of the orbiting objects and derives an orbit determination for each of the orbiting objects based on a single pass for the orbiting object through the first beam.

12. The system for detection and orbit determination of Earth orbiting objects as in claim 11, wherein the first antennas are further configured to stare at one of due east and due west along the equator.

13. The system for detection and orbit determination of Earth orbiting objects as in claim 12, further comprising:
a second sensor array including second antennas configured to point in a stare mode, monitor an angular region centered on an equatorial plane, and receive a third detection signal, the third detection signal comprising at least one return signal created by a reflection off of an Earth orbiting object.

14. The system for detection and orbit determination of Earth orbiting objects as in claim 13, further comprising:
a third sensor array located up to 10° latitude and including third antennas and configured monitor an angular region centered on an equatorial plane, the third antennas further configured to receive a fourth detection signal.

15. The system for detection and orbit determination of Earth orbiting objects as in claim 14, wherein the third sensor array is located at an off-zero latitude.

16. The system for detection and orbit determination of Earth orbiting objects as in claim 15, wherein at least one of the first plurality of sensors, the second plurality of sensors, and the third plurality of sensors is configured as a monostatic array.

17. A system for detection and orbit determination of Earth orbiting objects, comprising:
a first sensor array including first antennas, first antennas located ±10° relative to the equator and configured to point in a stare mode at a low inclination angle to broadcast a first beam including a first detection signal at an angular region centered on the equatorial plane to maximize detection of orbiting objects regardless of altitude, grade, or inclination, wherein the low elevation angle is an elevation angle of 20° or less with respect to a horizon, and wherein the system is configured to receive at least one return signal created by the first detection signal reflecting off of each of the orbiting objects and derive an orbit determination for each of the orbiting objects based on a single pass for the orbiting object through the first beam;
a second sensor array including second antennas configured to point in a stare mode, monitor an angular region centered on an equatorial plane, and receive a third detection signal, the third detection signal comprising at least one return signal created by a reflection off of an Earth orbiting object;
wherein a second detection signal is processed to determine a range and a range rate in relation to a location of the first sensor array, and the third detection signal is processed to determine a range and a range rate in relation to a location of the second sensor array; and wherein post-processing of the second detection signal is applied to determine an Angle of Arrival in relation to the location of the first sensor array, and wherein post-processing of the third detection signal is applied to determine an Angle of Arrival in relation to the location of the second sensor array.

18. The system for detection and orbit determination of Earth orbiting objects as in claim 17, further comprising:
a third sensor array including third antennas configured to point in a state mode, monitor an angular region centered on an equatorial plane, and receive a fourth detection signal, the fourth detection signal comprising at least one return signal created by a reflection off of an Earth orbiting object, wherein the third sensor array is located at an off-zero latitude pointed toward the equatorial plane.

19. The system for detection and orbit determination of Earth orbiting objects as in claim 1, wherein the system is further configured to adjust only the elevation of the first sensor array and to broadcast other beams at other elevation angles in the stare mode to detect synchronous station-kept orbiting satellites.

20. A method for detection and orbit determination of Earth orbiting objects, the method comprising the steps of:
providing a system including a first sensor array having first antennas located within ±10° of latitude relative to the equator;
pointing the first antennas in a stare mode to broadcast a first beam including a first detection signal at an angular region centered on the equatorial plane at a low elevation angle to maximize detection of orbiting objects regardless of altitude, grade, or inclination, wherein the low elevation angle is an elevation angle of 20° or less with respect to a horizon; and receiving, by the system, at least one return signal created by the first detection signal reflecting off of each of the orbiting objects and derive an orbit determination for each of the orbiting objects based on a single pass for the orbiting object through the first beam.

* * * * *